(12) United States Patent
Ahn

(10) Patent No.: US 10,637,660 B2
(45) Date of Patent: *Apr. 28, 2020

(54) SECURE PAYMENT AND AUTHENTICATION SYSTEM HAVING SECURITY FUNCTION ENHANCED BY USING QUANTUM CRYPTOGRAPHY

(71) Applicant: University of Seoul Industry Cooperation Foundation, Seoul (KR)

(72) Inventor: Do Yeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 101 days.

This patent is subject to a terminal disclaimer.

(21) Appl. No.: 15/655,485

(22) Filed: Jul. 20, 2017

(65) Prior Publication Data

US 2017/0324553 A1 Nov. 9, 2017

Related U.S. Application Data

(63) Continuation of application No. PCT/KR2016/000766, filed on Jan. 25, 2016.

(30) Foreign Application Priority Data

Jan. 23, 2015 (KR) .................. 10-2015-0011352

(51) Int. Cl.
*H04L 9/08* (2006.01)
*G06Q 20/38* (2012.01)
(Continued)

(52) U.S. Cl.
CPC ......... *H04L 9/0852* (2013.01); *G06Q 20/382* (2013.01); *H04L 9/0869* (2013.01);
(Continued)

(58) Field of Classification Search
CPC ... H04L 9/0852; H04L 9/0869; H04L 9/3226; H04L 9/30; H04L 2209/56; G06Q 20/382
See application file for complete search history.

(56) References Cited

U.S. PATENT DOCUMENTS 7,734,049 B2 6/2010 Niemi et al.
7,899,183 B2 3/2011 Tajima et al.
(Continued)

FOREIGN PATENT DOCUMENTS

JP 2005-217676 A 8/2005
JP 2006-203559 A 8/2006
(Continued)

OTHER PUBLICATIONS

Christian Schmid, Pavel Trojek, Mohamed Bourennane, Christian Kurtsiefer, Marek Żukowski, and Harald Weinfurter, "Experimental Single Qubit Quantum Secret Sharing", Dec. 2, 2005, Physical Review Letters, vol. 95, Iss. 23.*
(Continued)

*Primary Examiner* — Farid Homayounmehr
*Assistant Examiner* — Zhimei Zhu
(74) *Attorney, Agent, or Firm* — Nelson Mullins Riley & Scarborough LLP; Kongsik Kim, Esq.

(57) ABSTRACT

Disclosed herein are a quantum cryptography-based cryptographic communication system and an authentication, payment and transaction system via a relay device between a communication device and a server. A relay device for quantum cryptography authentication includes an optical receiver unit, an optical transmission unit, and a processor. The processor includes a quantum signal control unit, a user authentication unit, and a random number generation unit. The optical receiver unit receives a series of second quantum signals generated in such a manner that a series of first quantum signals generated by a first quantum filter and sent
(Continued)

from a communication device pass through the second quantum filter of the relay device or a reception side, and the optical transmission unit transfers the series of second quantum signals to a server.

18 Claims, 12 Drawing Sheets

(51) Int. Cl.
*H04L 9/30* (2006.01)
*H04L 9/32* (2006.01)

(52) U.S. Cl.
CPC .............. *H04L 9/30* (2013.01); *H04L 9/3226* (2013.01); *H04L 2209/56* (2013.01)

(56) References Cited

U.S. PATENT DOCUMENTS

| | | | |
|---|---|---|---|
| 8,600,051 B2 | 12/2013 | Noh | |
| 8,781,129 B2 | 7/2014 | Bush et al. | |
| 8,855,316 B2 | 10/2014 | Wiseman et al. | |
| 9,246,602 B2 | 1/2016 | Ukita et al. | |
| 2004/0120527 A1 | 6/2004 | Hawkes et al. | |
| 2007/0071245 A1* | 3/2007 | Kuang | H04L 9/0855 380/278 |
| 2007/0076884 A1* | 4/2007 | Wellbrock | H04L 9/0858 380/263 |
| 2008/0292095 A1* | 11/2008 | Vig | H04B 10/70 380/2 |
| 2010/0166187 A1* | 7/2010 | Trifonov | B82Y 10/00 380/279 |
| 2010/0293380 A1* | 11/2010 | Wiseman | H04L 9/0855 713/169 |
| 2010/0299526 A1* | 11/2010 | Wiseman | H04L 9/0855 713/171 |
| 2010/0329459 A1* | 12/2010 | Wiseman | H04B 10/70 380/256 |
| 2011/0064222 A1* | 3/2011 | Wiseman | H04L 9/0827 380/255 |
| 2011/0085666 A1* | 4/2011 | Hicks | H04L 9/0852 380/278 |
| 2011/0142242 A1 | 6/2011 | Tanaka | |
| 2011/0213979 A1* | 9/2011 | Wiseman | H04L 9/0844 713/171 |
| 2011/0228937 A1* | 9/2011 | Wiseman | H04L 9/0844 380/255 |
| 2011/0231665 A1* | 9/2011 | Wiseman | H04L 9/0838 713/181 |
| 2012/0195428 A1* | 8/2012 | Wellbrock | H04L 9/0855 380/255 |
| 2013/0083926 A1* | 4/2013 | Hughes | H04L 9/0836 380/278 |
| 2013/0101119 A1* | 4/2013 | Nordholt | H04L 9/083 380/256 |
| 2013/0101121 A1* | 4/2013 | Nordholt | H04L 9/0852 380/279 |
| 2013/0251145 A1* | 9/2013 | Lowans | H04L 9/0838 380/44 |
| 2014/0068765 A1* | 3/2014 | Choi | H04L 9/0852 726/23 |
| 2014/0233739 A1* | 8/2014 | Grice | H04L 9/0855 380/278 |
| 2014/0341575 A1* | 11/2014 | Choi | H04B 10/70 398/51 |
| 2015/0188701 A1* | 7/2015 | Nordholt | H04L 9/0852 713/171 |
| 2015/0222619 A1* | 8/2015 | Hughes | H04L 63/08 713/168 |
| 2015/0326391 A1 | 11/2015 | Cho et al. | |
| 2016/0248586 A1* | 8/2016 | Hughes | H04L 9/0852 |

FOREIGN PATENT DOCUMENTS

| | | |
|---|---|---|
| JP | 2012-80496 A | 4/2012 |
| JP | 2012-213143 A | 11/2012 |
| JP | 2013-544479 A | 12/2013 |
| JP | 5631743 B2 | 11/2014 |
| KR | 10-2003-0051600 A | 6/2003 |
| KR | 10-2006-0031853 A | 4/2006 |
| KR | 10-2009-0124679 A | 12/2009 |
| KR | 10-2014-0055146 A | 5/2014 |

OTHER PUBLICATIONS

Marcos Curty and Norbert Lütkenhaus, Intercept—resend attacks in the Bennett-Brassard 1984 quantum-key-distribution protocol with weak coherent pulses, Jun. 1, 2005, Physical Review A, vol. 71, Issue 6.*

H. Bechmann-Pasquinucci, Andrea Pasquinucci, "Quantum key distribution with trusted quantum relay", Published in ArXiv 2005, obtained from https://arxiv.org/pdf/quant-ph/0505089.pdf, retrieved on Jun. 9, 2019.*

Kim, Jae-Wan, "Quantum Cryptography", Korea Institute of Information Security and Cryptology, 14(3), 8-12, English Abstract. Jun. 2004, 7 pages.

Noh, T.G. et al, "Quantum Cryptography", ETRI (May 10, 205) pp. 70-83, English Abstract, 15 pages.

* cited by examiner

FIG. 1

| First Step:<br>Alice – selects a basis | ✥ | ✖ | ✖ | ✥ | ✖ | ✥ | ✖ | ✥ |
|---|---|---|---|---|---|---|---|---|
| Second Step:<br>Alice – selects a secret key value | 1 | 0 | 1 | 1 | 0 | 0 | 0 | 0 |
| Third Step:<br>Bob – selects a basis | ✥ | ✖ | ✥ | ✖ | ✖ | ✥ | ✥ | ✥ |
| Fourth Step:<br>measures the secret key value | 1 | 0 | 1 | 0 | 0 | 0 | 0 | 0 |
| Fifth Step:<br>compares bases – sifted key | O | O | – | – | O | O | – | O |

| quantum states corresponding to secret key values |
|---|
| 0: ↔ ↗ |
| 1: ↕ ↖ |

FIG. 2

| First Step:<br>Alice – selects a basis | ✦ | ✶ | ✶ | ✦ | ✶ | ✦ | ✶ | ✦ |
|---|---|---|---|---|---|---|---|---|
| Second Step:<br>Alice – selects a secret key value | 1 | 0 | 1 | 1 | 0 | 0 | 0 | 0 |
| Eavesdropping attempt by Eve — selects a basis | – | – | – | – | ✶ | ✶ | – | – |
| Eavesdropping attempt by Eve — eavesdropped information | – | – | – | – | 0 | 1 | – | – |
| Third Step:<br>Bob – selects a basis | ✦ | ✶ | ✦ | ✶ | ✶ | ✦ | ✦ | ✦ |
| Fourth Step:<br>measures the secret key value | 1 | 0 | 1 | 0 | 0 | 1 | 0 | 0 |
| Fifth Step:<br>compares bases – sifted key | O | O | – | – | O | O | – | O | quantum states corresponding to secret key values

0: ↔ ↗
1: ↕ ↘

The eavesdropping succeeds.

Errors occur due to the eavesdropping.

SECURE PAYMENT AND AUTHENTICATION SYSTEM HAVING SECURITY FUNCTION ENHANCED BY USING QUANTUM CRYPTOGRAPHY

CROSS-REFERENCE TO RELATED APPLICATION

This application is a continuation of PCT/KR2016/000766 filed on Jan. 25, 2016, which claims priority to Korean Application No. 10-2015-0011352 filed on Jan. 23, 2015, which applications are incorporated herein by reference.

TECHNICAL FIELD

The present invention relates to the communication technology of a communication system which is capable of cryptographic communication based on quantum cryptography, and more specifically to a quantum cryptography-based communication system and an authentication, payment and transaction system via a relay device between a communication device and a server, which are intended to enhance the security of an alternative payment system based on mobile commerce.

BACKGROUND ART

With the rapid expansion of the use of wired/wireless communication including Internet communication, issues related to the security of communication networks have become increasingly important in terms of the protection of the important secrets of nations, corporations, and banks and the protection of personal privacy. The asymmetric public key cryptosystem which was developed in the 1970s and is currently being widely used in communication systems, such as the Internet, etc., is a method designed to encrypt information by using a mathematically complex problem as a public key and to decrypt the information by using the solution to the problem as a private key, and is based on a mathematical "computational complexity" in principle.

As a representative, the RSA public key cryptosystem developed by the three persons, i.e., Rivest, Shamir, and Adleman, uses the difficulty of factoring very large numbers into primes. In other words, from a mathematical aspect, the factoring problem is based on the fact that as the size of a problem increases, computational time increases exponentially, with the result that when a sender and a receiver use the problem of factoring a sufficiently large number as a public key, it is practically impossible for an eavesdropper to decrypt a cryptogram. However, the security of the cryptosystem based on computational complexity is being questioned due to the development of more elaborate algorithms. Furthermore, as Peter Shor at AT&T developed a factoring algorithm using a quantum computer in 1994, it was proven that the RSA cryptosystem could be fundamentally cracked if a quantum computer was developed.

Quantum cryptography technology proposed as an alternative intended to overcome the above security problem has security based on the principle of quantum mechanics, i.e., the fundamental law of nature, rather than mathematical computational complexity, and thus it makes eavesdropping and monitoring difficult, with the result that it has attracted great attention recently. In other words, quantum cryptography technology is a technology designed to absolutely securely distribute a secret key (a one-time pad) between a sender and a receiver in real time based on the law of quantum physics, such as "the nonclonability of quantum information," and is also known as "quantum key distribution (QKD) technology."

The first quantum cryptography protocol was presented by C. H. Bennett at IBM and G. Brassard at the University of Montreal in 1984. This protocol named after the creators as the BB84 protocol uses four quantum states (for example, the polarization states of a single photon) constituting two bases.

One example of quantum cryptography technology is disclosed in the article "Quantum Cryptography Technology," Electronics and Telecommunication Trend Analysis, Vol. 20, No. 15, October 2005.

The prior art relates to quantum cryptography technology using the quantum system of a two-dimensional Hilbert space, i.e., a qubit (a quantum bit).

However, according to the prior art, transmission and reception devices are required for each of a communication device and a relay device or server in order to transmit and receive a quantum cryptogram, and thus the prior art has its limitation in that the burden of an installation cost for the transmission and reception devices between the communication device and the relay device or server increases.

SUMMARY OF THE DISCLOSURE

Quantum cryptography technology has significantly high security because a signal is deconstructed when eavesdropping is performed and this technology has a nonclonable attribute. However, the high cost of devices required to transmit and receive a quantum cryptogram has been an obstacle to the popularization of quantum cryptography technology for general users.

In particular, when a quantum cryptogram is received, the quantum cryptogram can be interpreted only when a polarization-controlled optical signal is received in a specific pattern and attenuated and then a single photon is detected by a single photon detector. The cost of the single photon detector is considerably high, and is thus an obstacle to popularization. Furthermore, it is difficult to fabricate a quantum cryptography receiver in a small size due to its characteristics, and thus it is difficult to install the quantum cryptography receiver in a general user terminal.

Conventional research and development into quantum cryptography technology focus chiefly on the efforts to improve the sensitivity and reliability of the reception of a quantum cryptogram. In conclusion, according to the conventional technology, quantum cryptography technology has high barriers to the access of general users.

An object of the present invention is to propose an authentication protocol using quantum cryptography via a relay device between a mobile device and a server by improving part of an authentication process via quantum cryptography in order to be formed to be small and lightweight. An object of the present invention is to propose an authentication protocol using quantum cryptography between a mobile device and a server or relay device and to propose an authentication method which can perform user authentication while maintaining high security in mobile commerce via the authentication protocol.

An object of the present invention is to provide mobile commerce via user authentication by generating a secret key at a relay device or a server via quantum cryptography-based encryption communication via a communication device including an optical transmission unit and the relay device or server including an optical receiver unit and sharing the generated secret key with the communication device.

Furthermore, an object of the present invention is to provide secure authentication and secure finance/payment services via quantum cryptography and user authentication, which is applicable to an environment in which a wired communication technique via an optical fiber or a free-space optical communication via a laser diode or photo diode can be used as a technique for sending a polarized signal or a photon signal, to which a phase time difference has been imparted, including a quantum cryptogram from a communication device to a relay device or from the relay device to a server.

Furthermore, an object of the present invention is to increase the security of a mobile payment application between a communication device and a relay device or server via a quantum key distribution (QKD) method.

According to an aspect of the present invention, there is provided a relay device for quantum cryptography authentication in the case where user authentication is performed in the relay device. The relay device for quantum cryptography authentication includes an optical receiver unit, an optical transmission unit, and a processor, and the processor includes a quantum signal control unit, a user authentication unit, and a random number generation unit.

The optical receiver unit receives a series of second quantum signals generated in such a manner that a series of first quantum signals generated by a first quantum filter and sent from a communication device pass through the second quantum filter of the relay device or a reception side, and the optical transmission unit transfers the series of second quantum signals to a server. In this case, there may be implemented an embodiment in which a polarization property is imparted to a photon used as a quantum signal, the photon is sent, and then the photon is measured and received using a polarization basis, and an embodiment in which a phase time difference is imparted to a photon and then the photon is measured and received using an interferometer. In the embodiment using polarization properties, the quantum filter may be a polarization basis, and the quantum signals may be polarized signals. In contrast, in the embodiment using phase time differences, the quantum filter may be a phase generator (a phase basis), and the quantum signals may be signals to which a phase time difference has been imparted.

The processor controls the first optical communication unit and the second optical communication unit. The quantum signal control unit included in the processor controls quantum signal generation characteristics of the optical receiver unit and the optical transmission unit based on information about the second quantum filter. In this case, the quantum signal generation characteristics may be polarization properties (the types of polarization bases) or the characteristics (the types of phase bases) of a phase time difference generation circuit.

The user authentication unit performs user authentication in conjunction with the communication device by using a secret key generated from the series of second quantum signals based on the information about the second quantum filter and information about the first quantum filter provided by the communication device. The random number generation unit randomly generates a series of quantum states based on random numbers. In this case, the quantum signal control unit generates the information about the second quantum filter based on the series of quantum states generated by the random number generation unit. The user authentication unit shares the information about the second quantum filter with the server, or transfers information about whether the user authentication is successful to the server.

According to another aspect of the present invention, there is provided a relay device for quantum cryptography communication in the case where user authentication is performed in a server. The relay device for quantum cryptography communication includes an optical receiver unit, an optical transmission unit, and a processor. The processor includes an identification unit, and a quantum signal control unit.

The optical receiver unit receives a series of first quantum signals generated by a first quantum filter and sent from a communication device, and the optical transmission unit transfers the series of first quantum signals to a server.

The processor configured to control the optical receiver unit and the optical transmission unit includes the identification unit, and the quantum signal control unit. The identification unit identifies information about the first quantum filter received from the communication device, and the quantum signal control unit controls the optical receiver unit to receive the series of first quantum signals by passing the series of first quantum signals through the first quantum filter based on the identified information about the first quantum filter, and controls the optical transmission unit to send the series of received first quantum signals to the server.

According to still another aspect of the present invention, there is provided a relay method for quantum cryptography authentication, the relay method including: receiving a series of second quantum signals generated in such a manner that a series of first quantum signals generated by a first quantum filter and sent from a communication device pass through a second quantum filter; transferring the series of second quantum signals to a server; controlling quantum signal generation characteristics based on information about the second quantum filter; and performing user authentication in conjunction with the communication device by using a secret key generated from the series of second quantum signals based on the information about the second quantum filter and information about the first quantum filter provided by the communication device.

The relay method further includes randomly generating a series of quantum states based on random numbers; the controlling includes generating the information about the second quantum filter based on the series of quantum states generated based on the random numbers; and the performing includes sharing the information about the second quantum filter with the server, or transferring information about whether the user authentication is successful to the server.

The controlling includes controlling the quantum signal generation characteristics based on the information about the second quantum filter received from the server; and the performing includes sharing the secret key with the server, or transferring information about whether the user authentication is successful to the server.

The receiving includes receiving the series of second quantum signals, generated in such a manner that the series of first quantum signals pass through the second quantum filter, from the communication device by using a free-space optical communication. The receiving includes transferring the series of second quantum signals to the server via a satellite relay device by using a free-space optical communication.

According to still another aspect of the present invention, there is provided a relay method for quantum cryptography communication, the relay method including: identifying information about a first quantum filter received from a communication device; controlling characteristics of a quantum signal generation circuit by means of the first quantum filter based on the identified information about the first quantum filter; receiving a series of first quantum signals, generated and sent by the first quantum filter by means of which the characteristics of the quantum signal generation circuit have been controlled, from the communication device; and transferring the series of first quantum signals to a server via the first quantum filter.

The receiving includes receiving the series of first quantum signals from the communication device by using a free-space optical communication. The transferring includes transferring the series of first quantum signals to the server by using an optical cable, or transferring the series of first quantum signals to the server by using a free-space optical communication.

The transferring includes transferring the series of first quantum signals to the server via a satellite relay device by using a free-space optical communication.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing a conventional quantum cryptography method;

FIG. 2 is a view showing a method of identifying eavesdropping via conventional quantum cryptography;

DETAILED DESCRIPTION OF THE DISCLOSURE

Figure 3:
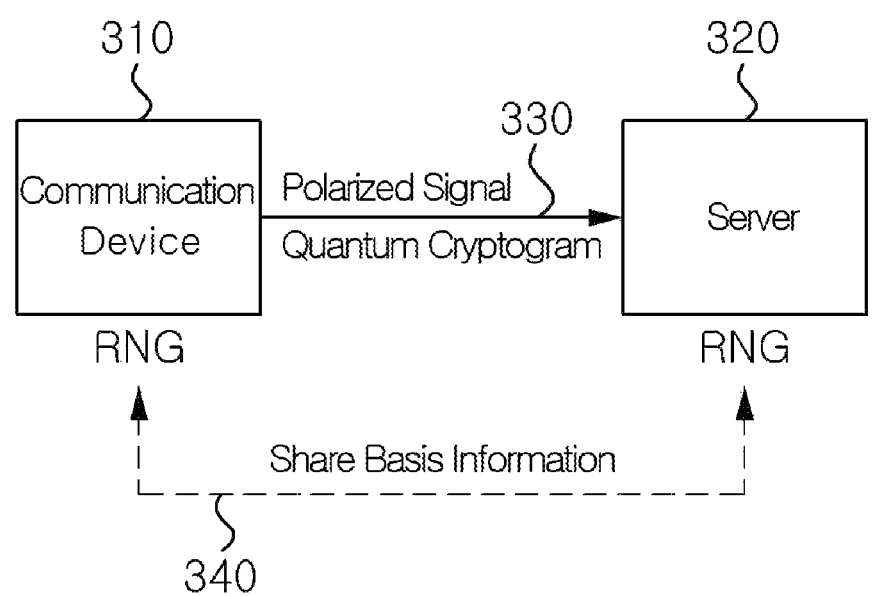
FIG. 3 is a diagram showing the communication relationship between a communication device and a server according to an embodiment of the present invention.

The above and other objects, features and advantages of the present invention will be more clearly understood from the following detailed description of embodiments taken in conjunction with the accompanying drawings.

The embodiments of the present invention will be described in detail with reference to the accompanying drawings. In the following description of the present invention, a detailed description of a related well-known component or function will be omitted when it is determined that the detailed description may make the gist of the present invention obscure.

The prevent invention is not limited to the embodiments. Throughout the accompanying drawings, the same reference symbols designate the same components.

FIG. 1 is a view showing a conventional quantum cryptography method. It will be apparent to those skilled in the art that the quantum cryptography technique shown in FIG. 1 can be used for the implementation of the present invention within the range in which the spirit of the present invention is not impaired and the range of the rights of the present invention is not reduced.

The first quantum cryptography protocol was presented by C. H. Bennett at IBM and G. Brassard at the University of Montreal in 1984. This protocol named after the creators as the BB84 protocol uses four quantum states (for example, the polarization states of a single photon) constituting two bases, as shown in FIG. 1.

In other words, a sender Alice randomly selects one of two bases, i.e., ✛ or ✕, at a first step, and randomly selects one of the two quantum states (secret key values), i.e., 0 and 1, of this selected basis and sends the selected quantum state to a receiver Bob at a second step. The receiver Bob who has received the quantum state also randomly selects one of the two bases at a third step, and measures the received quantum state by using this selected basis at a fourth step. After the receiver Bob has performed the measurement, the sender Alice and the receiver Bob reveal the bases, randomly selected by themselves, to each other. When the basis selected by the sender Alice and the basis selected by the receiver Bob are the same, the result measured by the receiver Bob is the same as the quantum state randomly selected by the sender Alice, and thus it is determined that the two users have the same secret keys (sifted keys) at a fifth step.

FIG. 2 is a view showing a method of identifying eavesdropping via conventional quantum cryptography. It will be apparent to those skilled in the art that the quantum cryptography technique shown in FIG. 2 can be used for the implementation of the present invention within the range in which the spirit of the present invention is not impaired and the range of the rights of the present invention is not reduced.

Referring to FIG. 2, during the quantum cryptography process from the first step to the fifth step described with reference to FIG. 1, if an eavesdropper Eve attempts eavesdropping, errors occur in secret key values obtained by the two users Alice and Bob according to the basic principle of quantum mechanics. The sender Alice and the receiver Bob reveal parts of generated keys to each other, and then the ratio of errors is calculated, thereby determining whether the eavesdropper Eve is present.

There may be implemented an embodiment in which a polarization property is imparted to a photon used as a quantum signal, the photon is sent, and then the photon is measured and received using a polarization basis, as shown in FIGS. 1 and 2. Furthermore, there may be implemented another embodiment in which a phase time difference is imparted to a photon and then the photon is measured and received using an interferometer. In the embodiment using polarization properties, a quantum filter may be a polarization basis, and a quantum signal may be a polarized signal. In contrast, in the embodiment using phase time differences, a quantum filter may be a phase generator, and a quantum signal is a signal to which a phase time difference has been imparted.

For example, a phase time difference-based phase filter may have a phase delay value of 90/270 degrees or 0/180 degrees according to a randomly generated quantum state. In other words, a phase generator (a phase filter) having a phase delay value of 90/270 degrees may correspond to the quantum state "0," and a phase generator having a phase delay value of 0/180 degrees may correspond to the quantum state "1."

According to a secret key value, a quantum signal having one of specific quantum signal values, i.e., 90 and 270 degrees, or 0 and 180 degrees, within a predetermined phase generator may be generated.

In the generation of a quantum signal, the method using polarization properties and the method using phase time differences are well known, and are equivalent to each other. In the implementation of the spirit of the present invention, there is no substantial difference between the method using polarization properties and the method using phase time differences. The spirit of the present invention is not limited by the selection of one of these methods.

For ease of description, the process of generating and measuring a quantum signal is described with a focus on the method using polarization properties below.

FIG. 3 is a diagram showing the communication relationship between a communication device and a server according to an embodiment of the present invention.

A communication device 310 according to the present invention may be a mobile device or a personal terminal, generates a quantum cryptogram, and shares basis information, used for the generation of the quantum cryptogram, with a server 320. The communication device 310 functions as Alice shown in FIGS. 1 and 2, and the server 320 functions as Bob shown in FIGS. 1 and 2.

Polarized signals including the quantum cryptogram generated by the communication device 310 is transferred to the communication server 320 via an optical communication channel 330, and the basis information used for the generation of the quantum cryptogram by the communication device 310 may be shared via a general communication network 340 between the communication device 310 and the communication server 320. The server 320 receives and interprets the polarized signals, in which case basis information used for the interpretation of the polarized signal may be shared with the communication device 310 via the communication network 340.

In this case, the communication device 310 may send the polarized signals including the quantum cryptogram to the server 330 via an optical fiber capable of optical communication. Meanwhile, when the communication device 310 is a mobile device, the polarized signals including the quantum cryptogram may be sent from the communication device 310 by using a free-space optical communication, and may be received by the communication server 320. In this case, the free-space optical communication refers to an optical communication technique which is used in an environment in which polarized signals sent by the communication device 310 can directly reach the server 320 without an obstacle in the path from the communication device 310 to the server 320. The free-space optical communication may be viewed as a direct face-to-face method. The communication device 310 may send the polarized signals by means of a laser diode (LD) or a photo diode (PD).

Furthermore, the communication device 310 and the server 320 may share the polarization basis information, used for the generation of the quantum cryptogram by the communication device 310, with each other via the general communication network 340 including a wired communication network and a wireless communication network. In contrast, the polarization basis information used for the reception and the interpretation by the server 320 may be shared with the communication device 310. In this case, each of the communication device 310 and the communication server 320 may generate the polarization basis information based on a series of quantum states randomly generated by the random number generation unit RNG of each of the communication device 310 and the communication server 320, and may share the polarization basis information with the other party. In this case, the generation of random numbers may be performed using a quantum random number generator (QRNG) in order to achieve more complete randomness.

Although FIG. 3 shows an embodiment in which the quantum cryptogram is sent directly from the communication device 310 to the server 320, the spirit of the present invention is not limited thereto, but there may be implemented an embodiment using a method in which a relay device relays and transfers polarized signals. An embodiment of the relay method will be described using FIGS. 6 to 9 later.

Figure 6:
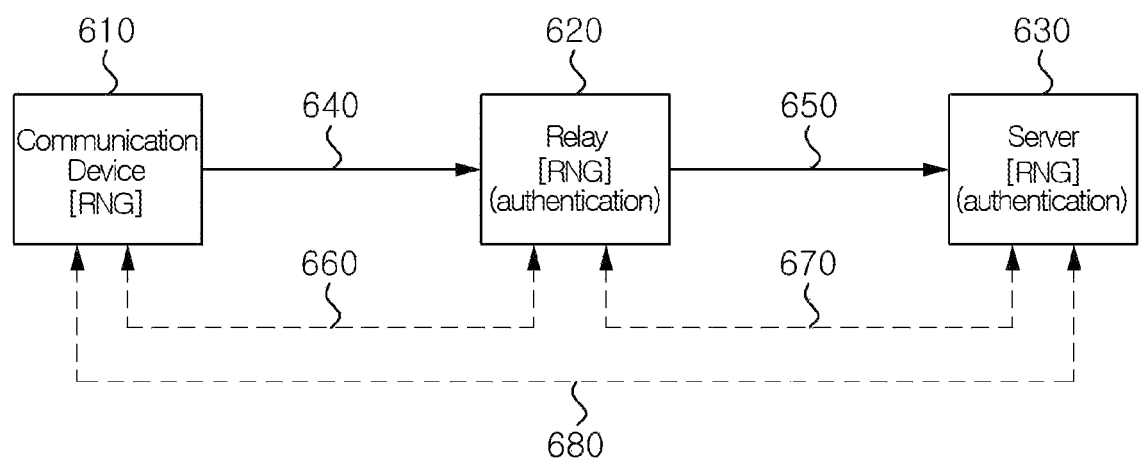
FIG. 6 is a diagram showing a quantum cryptography-based communication and user authentication network system including a relay device according to an embodiment of the present invention.

FIG. 6 is a diagram showing a quantum cryptography-based communication and user authentication network system including a relay device according to an embodiment of the present invention. Referring to FIG. 6, there is shown the communication and user authentication network system in which each of the relay device 620 and the communication server 630 performs independent user authentication.

In this case, the relay device 620 may be a fixed terminal configured to enable banking, finance or card payment and equipped with a security function, such as a POS terminal, or a bank ATM terminal. Furthermore, the relay device 620 may be a fixed terminal for an individual, a home, or an office, which has the function of performing optical communication with the communication device 610. For example, the relay device 620 may be implemented in the form of a set-top box that is connected to the server 630 via an optical cable and installed in a home or office.

The server 630 shares information, obtained through communication and authentication in conjunction with the relay device 620 and the communication device 400, with a service provider (SP) who provides card, finance or banking service, or the like, thereby performing a payment, banking, or finance transaction.

The communication and user authentication network system of FIG. 6 includes a communication device 610, a relay device 620, and a server 630. In this case, each of the communication device 610, the relay device 620, and the server 630 may include an RNG.

The communication device 610 selects a first polarization basis based on a series of randomly generated first quantum states, and sends a series of first polarized signals, generated based on the first polarization basis, to the relay device 620 by using a free-space optical communication channel 640. The communication device 610 may generate a series of bits (see the secret keys of FIGS. 1 and 2) based on a series of second quantum states generated to randomly have a value of 0 or 1, may generate the first polarized signals by applying the first polarization basis to the series of secret keys, and may send the first polarized signals.

Figure 5:
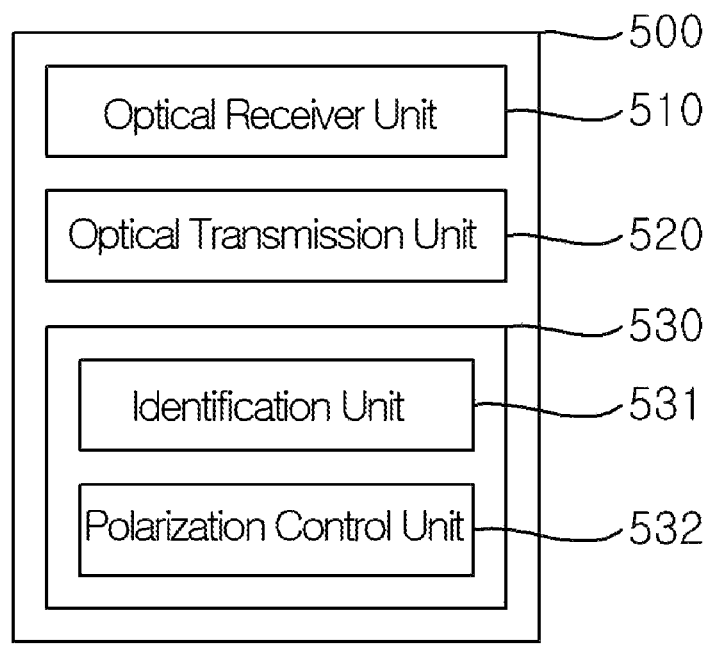
FIG. 5 is a diagram showing, in detail, a relay device for quantum cryptography authentication in a communication and authentication system in which user authentication is performed by a server according to an embodiment of the present invention.

The relay device 620 may include modules, such as an optical receiver unit 510 and optical transmission unit 520 shown in conjunction with the server 500 of FIG. 5. The relay device 620 may determine a second polarization basis based on a series of third quantum states generated by the RNG. The relay device 620 may obtain second polarized signals by passing the first polarized signals, received via the optical communication channel 640, through the second polarization basis.

Thereafter, the communication device 610 and the relay device 620 share information about the first polarization basis generated by the communication device 610 and information about the second polarization basis generated by the relay device 620 via a wired/wireless communication network 660.

The communication device 610 and the relay device 620 may generate a first secret key between the communication device 610 and the relay device 620 based on the information about the first polarization basis and the information about the second polarization basis, and may share the first secret key with the other party. The relay device 620 may process first user authentication with the communication device 610.

Since the server 630 includes its own separate RNG, the server 630 may determine a third polarization basis through the separate generation of random numbers. In this case, the relay device 620 may transfer the second polarized signals to the server 630 by using the optical communication channel 650, and the server 630 may obtain third polarized signals by passing the second polarized signals through the third polarization basis. In this case, the optical communication channel 650 may be an optical cable, a free-space optical communication channel, or an optical communication channel passing through a satellite.

In this case, the relay device 620 may transfer information about the result of the first user authentication to the server 630 via a wired/wireless communication network 670. The server 630 may complete the authentication of the user by integrating the result of second user authentication to be described later with the result of the first user authentication, and may request a transaction from an SP who provides payment, banking or finance service, or the like.

In this case, the communication device 610 and the server 630 may share the first polarization basis information generated by the communication device 610 and the third polarization basis information generated by the server 630 with each other via a wired/wireless communication network 680.

Accordingly, the server 630 may generate a second secret key between the communication device 610 and the server 630 based on the information about the first polarization basis and the information about the third polarization basis, and may share the second secret key with the communication device 610. The server 630 may process second user authentication based on the second secret key.

In this case, the server 630 may transfer information about the result of the second user authentication via the wired/wireless communication network 670.

Alternatively, according to another embodiment of the present invention, the relay device 620 may transfer the second polarized signals, generated in such a manner that the series of first polarized signals generated based on the first polarization basis and sent by the communication device 610 pass through the second polarization basis at the relay device 620, to the server 630 via the optical communication channel 650, in which case information about the first polarization basis and information about the second polarization basis may be simultaneously transferred to the server 630 via the wired/wireless communication network 670.

Accordingly, the server 630 may generate a third secret key between the communication device 610 and the server 630 based on the information about the first polarization basis, the information about the second polarization basis, and the information about the third polarization basis, and may share the third secret key with the communication device 610. The server 630 may process second user authentication.

In this case, the server 630 may transfer information about the result of the second user authentication via the wired/wireless communication network 670.

In this case, the information about the first polarization basis at the communication device 610 may be transferred from the communication device 610 via the wired/wireless communication network 680 to the server 630.

Figure 7:
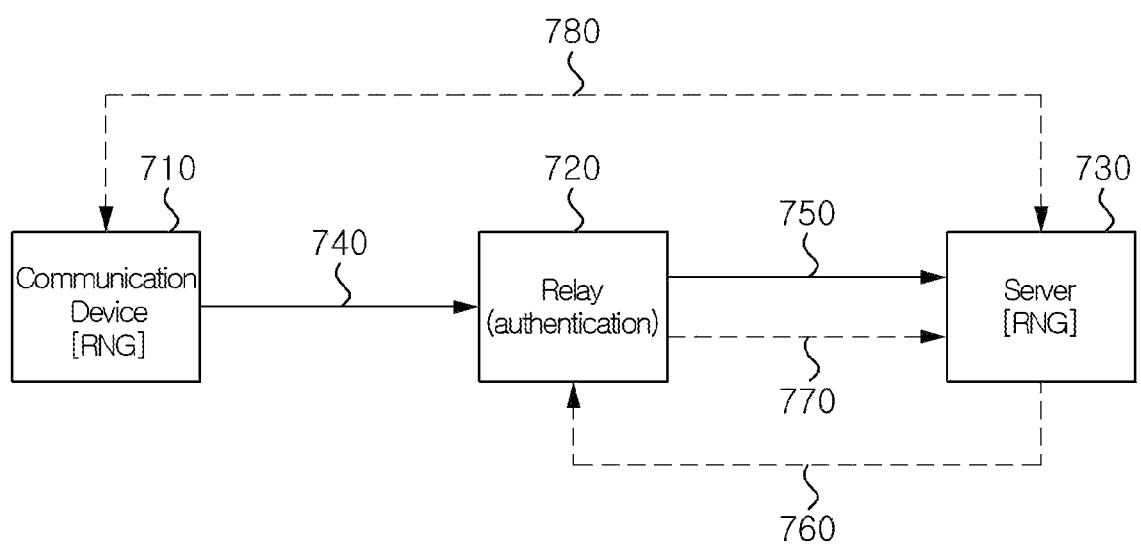
FIG. 7 is a diagram showing a quantum cryptography-based communication and user authentication network system including a relay device according to another embodiment of the present invention.

FIG. 7 is a diagram showing a quantum cryptography-based communication and user authentication network system including a relay device according to another embodiment of the present invention. Referring to FIG. 7, there is shown the communication and user authentication network system in which a relay device 720 performs a quantum cryptography-based user authentication.

The communication and user authentication network system of FIG. 7 includes a communication device 710, a relay device 720, and a server 730.

Since the communication device 710 of FIG. 7 performs the same function as the communication devices 310, 400 and 610 of FIGS. 3, 4 and 6, a redundant description thereof is omitted below. The relay device 720 and server 730 of FIG. 7 are described with a focus on functions unique to the embodiment of FIG. 7, and redundant descriptions thereof are omitted below. The optical communication channel 740 may be viewed as having the same configuration as the optical communication channel 640 of FIG. 6.

In FIG. 7, there is shown an embodiment in which an RNG is included in the server 730 but an authentication process using quantum cryptography is performed by the relay device 720. In other words, the relay device 720 includes an optical reception module configured to receive first polarized signals, but does not include an RNG. Accordingly, the relay device 720 receives third quantum state-based second polarization basis information, generated by the RNG of the server 730, from the server 730.

The second polarization basis information is transferred from the server 730 via a wired/wireless communication network 760 to the relay device 720, and is shared with the communication device 710 via a wired/wireless communication network 780.

For the relay device 720 to perform user authentication, first polarization basis information needs to be shared with the relay device 720. The first polarization basis information may be transferred from the communication device 710 via a wired/wireless communication network (not shown) to the relay device 720, or may be transferred from the communication device 710 via the wired/wireless communication network 780 to the server 730 and then transferred from the server 730 via the wired/wireless communication network 760 to the relay device 720.

The result of user authentication performed by the relay device 720 or a secret key may be transferred to the server 730 via a separate communication channel 770 maintaining security. Meanwhile, according to an embodiment of the present invention, the relay device 720 may re-transfer second polarized signals to the server 730 via an optical communication channel 750. The server 730 may directly receive the second polarized signals, thereby re-checking the result of the user authentication performed by the relay device 720. However, the possibility that an authentication process performed by the relay device 720 might influence the quantum cryptogram needs to be taken into consideration.

Since the secret key may be obtained based on quantum cryptograms, the first polarization basis information and the second polarization basis information, the relay device 720 having directly received the quantum cryptograms and the communication device 710 having generated the quantum cryptograms may share the secret key with each other in principle. To share the secret key with the server 730, the secret key may be transferred to the server 730 under a special condition, such as the condition of the separate communication channel 770 maintaining security, as described above.

Figure 8:
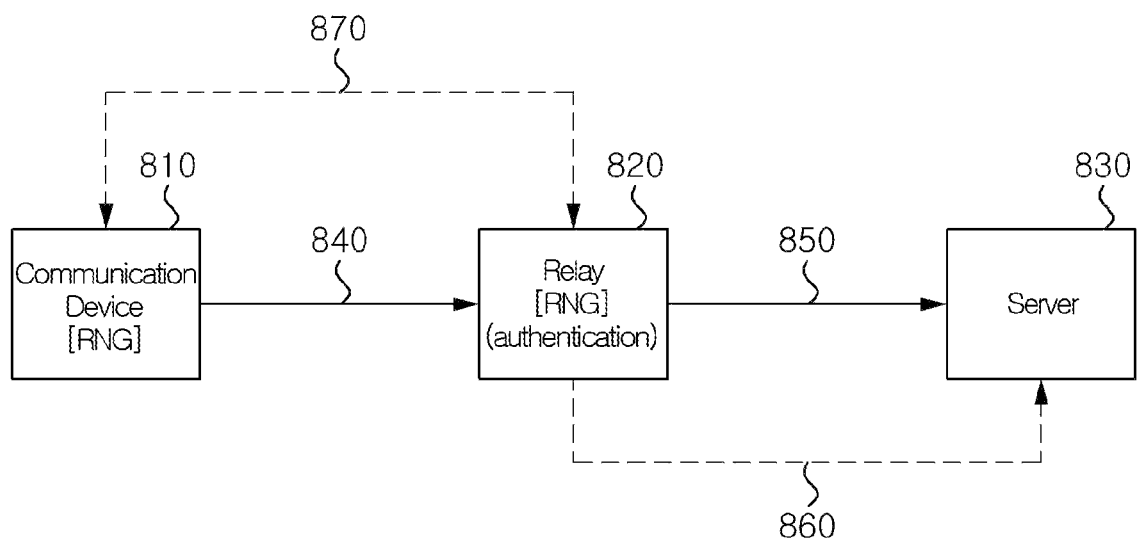
FIG. 8 is a diagram showing a quantum cryptography-based communication and user authentication network system including a relay device according to still another embodiment of the present invention.

FIG. 8 is a diagram showing a quantum cryptography-based communication and user authentication network system including a relay device according to still another embodiment of the present invention. The communication and user authentication network system of FIG. 8 corresponds to an embodiment in which random number generation and authentication processes are performed by a relay device 820.

Referring to FIG. 8, an optical communication channel 840 transfers first polarized signals including a quantum cryptogram generated by a communication device 810, to the relay device 820. Since the relay device 820 may generate quantum states by itself, it may generate second polarization basis information by itself.

The communication device 810 and the relay device 820 may share first polarization basis information and the second polarization basis information via a wired/wireless communication network 870, may generate a secret key, and may perform quantum cryptography-based user authentication.

The relay device 820 may transfer the result of the quantum cryptography-based user authentication to a server 830 via a wired/wireless communication network 860. The server 830 may generates a substantial transaction in conjunction with a service provider who provides banking, finance, or payment service, or the like, as described above.

In an embodiment, an optical communication channel 850 may deliver second polarized signals, received by the relay device 820, to the server 830, or may deliver polarized signals, generated based on a new quantum cryptogram, to the server 830. Not only the result of the user authentication but also a secret key may be transferred to the server 830 via the wired/wireless communication network 860, in which case the communication network 860 needs to be a special communication network maintaining security.

Figure 9:
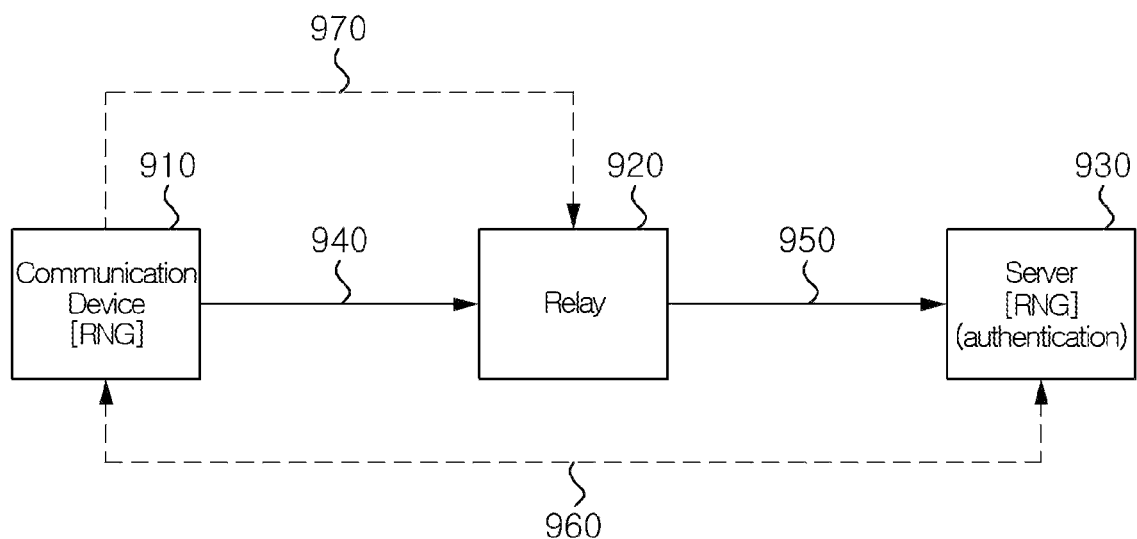
FIG. 9 is a diagram showing a quantum cryptography-based communication and user authentication network system including a relay device according to still another embodiment of the present invention.

FIG. 9 is a diagram showing a quantum cryptography-based communication and user authentication network system including a relay device according to still another embodiment of the present invention. The communication and user authentication network system of FIG. 9 corresponds to an embodiment in which a server 930 performs random number generation and user authentication.

The communication and user authentication network system of FIG. 9 includes a communication device 910, a relay device 920, and the server 930.

Referring to FIG. 9, an optical communication channel 940 transfers first polarized signals including a quantum cryptogram generated by the communication device 910, to the relay device 920.

In this case, the relay device 920 transfers the received first polarized signals to the server 930 via an optical communication channel 950 without change. The relay device 920 receives first polarization basis information from the communication device 910 via a wired/wireless communication network 970. The relay device 920 receives the first polarized signals by using the first polarization basis information, maintains the quantum cryptogram information of the first polarized signals, sends the quantum cryptogram information of the first polarized signals by using the first polarization basis information, and transfers the quantum cryptogram information of the first polarized signals to the server 930 via the optical communication channel 950.

Thereafter, the first polarization basis information generated by the communication device 910 and the second polarization basis information generated by the server 930 are shared via a wired/wireless communication network 960.

Accordingly, the server 930 may generate a secret key between the communication device 910 and the server 930 based on the first polarization basis information and the second polarization basis information, may share the secret key with the communication device 910, and may process user authentication.

Although the respective separate embodiments have been shown in FIGS. 6 to 9 for ease of description, the spirit of the present invention is not limited thereto. For example, in order to increase security, there may be implemented a modified embodiment in which the embodiment of FIG. 6 is applied to the first part of all the quantum cryptograms generated by the communication devices 310, 400, 610, 710, 810, and 910 and the embodiment of FIG. 8 is applied to the second part thereof, or there may be implemented a modified embodiment in which the embodiment of FIG. 7 is applied to the first part and the embodiment of FIG. 9 is applied to the second part.

Figure 4:
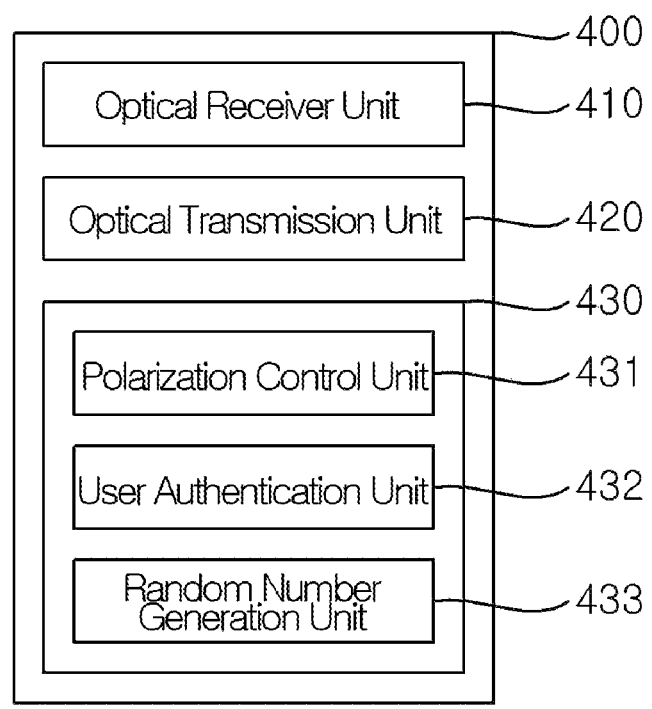
FIG. 4 is a diagram showing a relay device for quantum cryptography authentication according to an embodiment of the present invention in detail.

FIG. 4 is a diagram showing a relay device for quantum cryptography authentication according to an embodiment of the present invention in detail. The relay device 400 of FIG. 4 may be included in each of the embodiments of FIGS. 6 to 8. In other words, the relay device 400 may correspond to each of the relay devices 620, 720 and 820 of FIGS. 6 to 8, and a redundant description thereof will be omitted as far as possible.

Referring to FIG. 4, the relay device 400 includes an optical receiver unit 410, an optical transmission unit 420, and a processor 430, and the processor 430 includes a polarization control unit 431, a user authentication unit 432, and a random number generation unit 433.

The optical receiver unit 410 receives a series of second polarized signals that are generated in such a manner that a series of first polarized signals generated based on a first polarization basis and sent from the communication device pass through the second polarization basis of the relay device 400. In this case, the series of first polarized signals may be received from the communication device 610, 710 or 810 via the free-space optical communication channel 640, 740 or 840 between the communication device 610, 710 or 810 and the relay device 400, 620, 720 or 820. Polarization filtering using the second polarization basis different from that of the communication devices 610, 710 and 810 is performed on the first polarized signals by the optical receiver unit 410. The free-space optical communication refers to optical communication based on a direct face-to-face method, as described above.

In this case, a laser diode or photo diode does not require high output. It is sufficient if the laser diode or photo diode has only enough output for a quantum cryptogram to reach the relay device 400, 620, 720 or 820 via free-space optical communication or direct face-to-face optical communication between the communication device 610, 710 or 810 and the relay device 400, 620, 720 or 820.

For example, when the distance between the communication device 610, 710 or 810 and the relay device 400, 620, 720 or 820 is within 10 cm, it will be sufficient if a laser diode or photo diode having enough output to send and receive a quantum cryptogram without loss is installed in the communication device.

The optical transmission unit 420 transfers the series of second polarized signals to the server 630, 730 or 830 via the optical communication channel 650, 750 or 850, in which case the optical communication channel 650, 750 or 850 may be an optical cable or free-space optical communication channel.

The processor 430 functions to control the optical receiver unit 410 and the optical transmission unit 420. In particular, the polarization control unit 431 functions to control the polarization characteristics properties of the optical receiver unit 410 and the optical transmission unit 420 based on information about the second polarization basis.

Furthermore, the processor 430 may include the polarization control unit 431, the user authentication unit 432, and the random number generation unit 433 as sub-modules. These sub-modules may be implemented and distinguished using hardware, or may be implemented and distinguished using programs, a set of commands, or a set of instructions loaded onto memory.

In this case, in an embodiment, the user authentication unit 432 functions to perform user authentication in conjunction with the communication device by using a secret key that is generated from the series of second polarized signals based on the information about the second polarization basis and information about the first polarization basis provided by the communication device.

In this case, according to the embodiment of FIG. 6, the secret key may be generated by each of the relay device 400 or 620 and the communication device 610, or a separate secret key may be generated by each of the server 630 and communication device 610 of FIG. 6.

Meanwhile, according to the embodiment of FIG. 7, the secret key may be generated by each of the relay device 400 or 720 and the communication device 710, or may be transferred from the relay device 400 or 720 via the channel 770 maintaining security to the server 730.

According to the embodiment of FIG. 8, the secret key may be generated by each of the relay device 400 or 820 and the communication device 810, or may be transferred from the relay device 400 or 820 via the separate channel 860 maintaining security to the server 830.

In the embodiments of FIGS. 6 to 8, for the relay device 400, 620, 720 or 820 to generate the secret key, the first polarization basis information may be received from the communication device 610, 710 or 810 or may be received from the server 630, 730 or 830 via a detour path, and the second polarization basis information may be transferred from the relay device 400, 620, 720 or 820 or server 630, 730 or 830 to the communication device 610, 710 or 810.

Accordingly, the relay device 400, 620, 720 or 820 shares secret key information, obtained through quantum cryptography and authentication, with an SP who provides card, finance or banking service, or the like via the server 630, 730 or 830, thereby performing a payment, banking, or finance transaction.

The relay device 400, 620, 720 or 820 may include the random number generation unit 433 configured to randomly generate a series of quantum states based on random numbers, in which case the polarization control unit 431 may generate the information about the second polarization basis based on the series of quantum states generated by the random number generation unit 433, and the user authentication unit 432 may share the information about the second polarization basis with the server 630, 730 or 830, or may transfer information about whether user authentication is successful to the server 630, 730 or 830.

FIG. 5 is a diagram showing, in detail, a relay device 500 for quantum cryptography authentication in a communication and authentication system in which user authentication is performed by a server according to an embodiment of the present invention. The relay device 500 of FIG. 5 may be included in the embodiment of FIG. 9, and may correspond to the relay device 920 of FIG. 9.

The relay device 500 for quantum cryptography authentication includes an optical receiver unit 510, an optical transmission unit 520, and a processor 530, and the processor includes an identification unit 531, and a polarization control unit 532.

The optical receiver unit 510 receives a series of first polarized signals, generated based on a first polarization basis and then sent, from the communication device 910. In this case, the optical communication channel 940 via which the series of first polarized signals are transferred may be a free-space optical communication channel.

The optical transmission unit 520 functions to transfer the series of first polarized signals to the server 930. In this case, the optical communication channel 950 via which the series of first polarized signals are transferred may be an optical cable, a free-space optical communication channel, or an optical communication channel passing through a satellite relay device.

The processor 530 functions to control the optical receiver unit 510 and the optical transmission unit 520. In greater detail, the identification unit 531 included in the processor 530 identifies information about the first polarization basis received from the communication device 910. The polarization control unit 532 controls the optical receiver unit 510 to receive signals by passing the series of first polarized signals through the information about the first polarization basis identified by the identification unit 531, and controls the optical transmission unit 520 to send the series of received first polarized signals are transferred to the server 930.

The relay device 500 or 920 relays quantum cryptogram information within the first polarized signals to the server 930 without change, thereby supporting secret key sharing and user authentication between the communication device 910 and the server 930.

Figure 10:
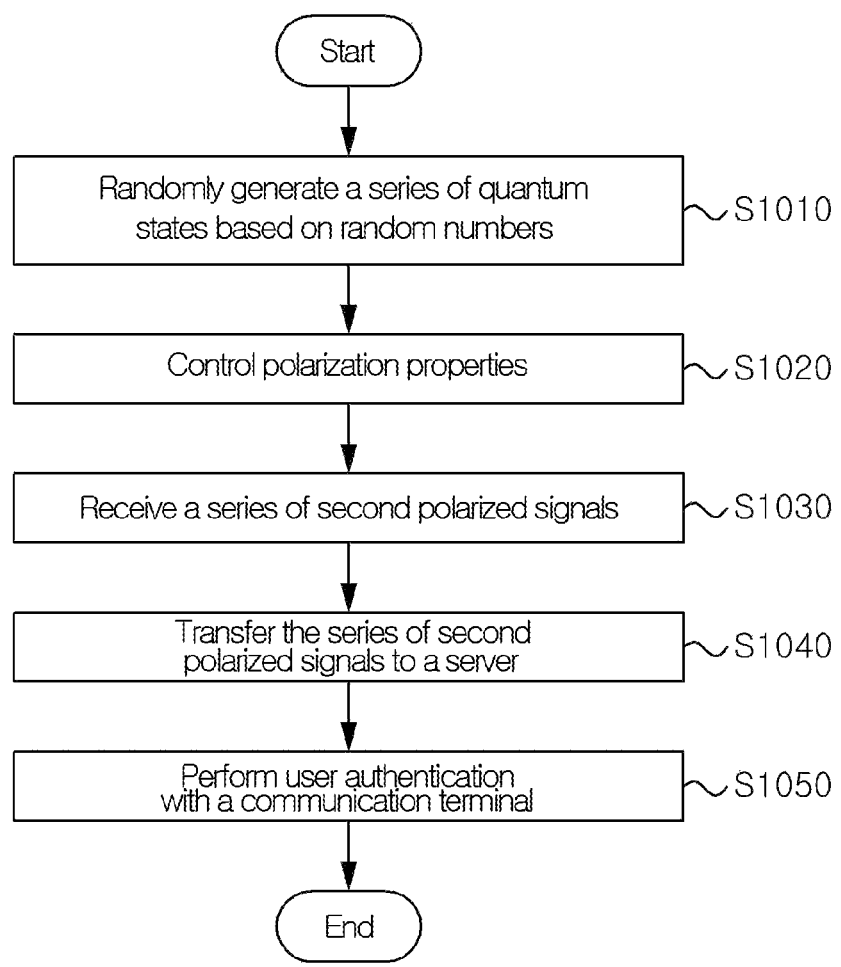
FIG. 10 is an operation flowchart showing a quantum cryptography authentication method for a relay device for quantum cryptography authentication according to an embodiment of the present invention.

FIG. 10 is an operation flowchart showing a quantum cryptography authentication method for a relay device for quantum cryptography authentication according to an embodiment of the present invention.

The relay device 400, 610, 710 or 810 for quantum cryptography authentication randomly generates a series of quantum states based on random numbers at step S1010, and controls polarization properties based on information about a second polarization basis at step S1020.

Thereafter, the relay device 400, 610, 710 or 810 receives a series of second polarized signals generated in such a manner that a series of first polarized signals generated based on a first polarization basis and sent from the communication device 610, 710 or 810 pass through the second polarization basis at step S1030, may transfer the series of second polarized signals to the server 630, 730 or 830 at step S1040, and performs user authentication in conjunction with the communication device 610, 710 or 810 by using a secret key generated from the series of second polarized signals based on the information about the second polarization basis and information about a first polarization basis provided by the communication device 610, 710 or 810 at step S1050. In this case, step S1040 is not essential for the performance of user authentication, and may be omitted as desired.

In this case, according to an embodiment, the relay device 400, 620 or 820 may generate the information about the second polarization basis based on the series of quantum states generated based the random numbers, and may share the information about the second polarization basis with the server 630 or 830, or transfer information about whether the user authentication is successful to the server 630 or 830.

Furthermore, according to another embodiment, the relay device 720 may control the polarization properties of the optical receiver unit 510 and the optical transmission unit 520 based on the information about the second polarization basis received from the server 730.

The relay device 400, 620, 720 or 820 may share the secret key with the server 630, 730 or 830, or may transfer the information about whether the user authentication is successful to the server 630, 730 or 830.

Furthermore, the relay device 400, 620 or 820 according to an embodiment may further improve the randomness of the quantum states, generated at step S1010, by using a quantum random number generator (QRNG).

Figure 11:
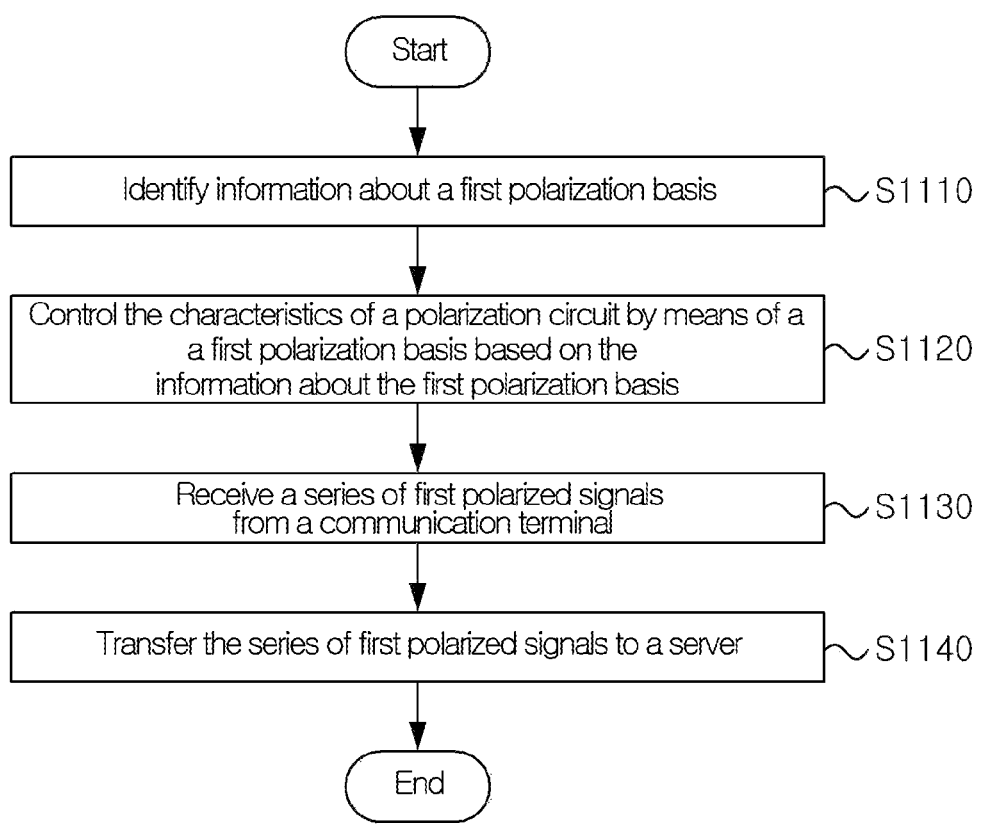
FIG. 11 is an operation flowchart showing a communication method for a relay device for quantum cryptography authentication according to another embodiment of the present invention.

FIG. 11 is an operation flowchart showing a communication method for a relay device for quantum cryptography authentication according to another embodiment of the present invention. FIG. 11 corresponds to a communication relay method which is performed by the relay devices 500 and 920 of FIGS. 5 and 9.

The identification unit 531 of the relay device 500 or 920 identifies information about a first polarization basis received from the communication device 910 at step S1110, and the polarization control unit 532 controls the properties of a polarization circuit based on the first polarization basis by using the identified information about the first polarization basis at step S1120.

Thereafter, in the state where the properties of the polarization circuit have been controlled based on the first polarization basis, the optical receiver unit 510 receives a series of first polarized signals generated and sent by the communication device 920 at step S1130, and transfers the series of first polarized signals to the server 930 through the first polarization basis at step S1140.

Figure 12:
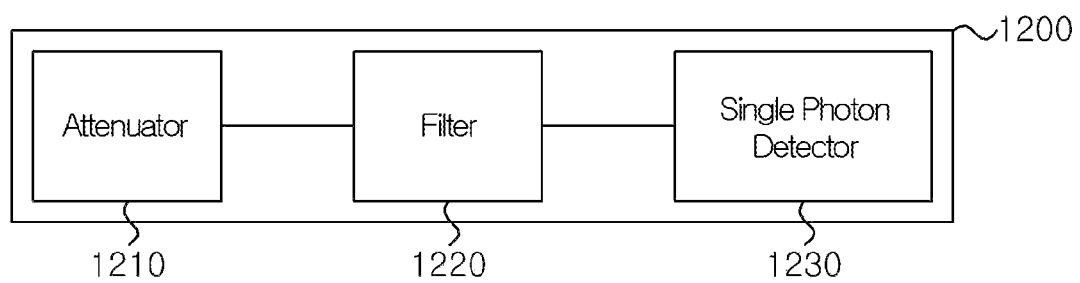
FIG. 12 is a diagram showing the optical receiver unit of a quantum cryptography relay device according to an embodiment of the present invention.

FIG. 12 is a diagram showing the optical receiver unit 1200 of a quantum cryptography relay device according to an embodiment of the present invention.

The optical receiver unit 1200 includes an attenuator 1210, a filter 1220, and a detector 1230.

The attenuator 1210 is a device configured to attenuate light (the amount or amplitude of light) propagating across an optical fiber or space by a predetermined level. The attenuator 1210 is required to provide appropriate input to a light reception device or an optical device, and is also used to evaluate the loss of an optical device.

Generally, methods of attenuating light include a method of attenuating light by absorbing part of the light, a method of attenuating light by reflecting part of the light, and a method of attenuating light by spatially blocking part of the light. Currently, the method of attenuating light by reflecting part of the light is chiefly being used. Accordingly, the attenuator 1210 functions to adjust first polarized signals, received via a free-space optical communication channel, to a set predetermined level.

The filter 1220 functions to filter the first polarized signals, adjusted to the predetermined level by the attenuator 1210, in a single photon form, and the detector 1230 measures the first quantum states of the filtered first polarized signals.

By using the optical receiver unit, the first polarized signals sent from the communication devices 310, 400, 610, 710, 810 and 910 may be controlled and received via a single photon by using a laser diode (LD) or a photo diode (PD).

The cost of the hardware required to receive a polarized signal by controlling the polarized signal via a single photon, as shown in FIG. 12, is high, and thus it is difficult to install the hardware in a mobile device or a personal terminal. Accordingly, the present invention proposes the authentication protocol using quantum cryptography via the terminal which can be formed to be small and lightweight and implemented at low cost by improving part of an authentication process via quantum cryptography. According to the present invention, the authentication protocol using quantum cryptography between the mobile device and the server or relay device can be implemented, through which in mobile commerce, user authentication can be performed while high security is being maintained.

Furthermore, the communication device according to the present invention only sends a polarized signal to the server and does not need to be equipped with an optical reception function module, and thus the quantum cryptography protocol practically applicable to the communication device is proposed. The present invention provides a significant cost reduction effect compared to the conventional quantum cryptography technique.

In the present invention, an optical receiver unit is not included in the communication device, and the optical receiver unit for quantum cryptography is included in each of the server and the relay device and thus can receive a polarized signal sent by the communication device.

The communication device described herein may be a mobile communication device including a smartphone, a PDA, and a portable phone. The communication device may generate and send a quantum cryptogram by using a polarized signal generation device formed by combining an RNG and a laser diode.

Meanwhile, when the mobile device according to the present invention is disposed within a considerably short distance from the optical reception device of the server or relay device, the mobile device can send a quantum cryptogram in a direct face-to-face manner. In this case, the mobile device and the server/relay device are disposed within up to a short distance (for example, 1 cm) which can prevent a third party from practically performing eavesdropping. Since it is sufficient that the mobile device generates a polarized signal at a strength at which the server/relay device can receive the polarized signal, quantum cryptography-based mobile commerce can be implemented at low cost.

The relay system according to the present invention can increase the transfer efficiency of quantum cryptography because each of the relay devices 620, 720, 820 and 920 is disposed between the communication device 610, 710, 810 or 910 and the relay device 620, 720, 820 or 930 and takes charge of the partial function of the server 630, 730, 830 or

930. According to a modified embodiment, the security of quantum cryptography can be further enhanced.

Each of the relay devices 620, 720 and 820 can reduce the authentication and processing load of the server 630, 730 or 830 because it takes charge of at least one of the random number generation function and authentication function of the server 630, 730 or 830, and can increase the possibility of the success of payment in mobile commerce or online commerce because it separates an quantum cryptography authentication process and a transaction authentication process performed in conjunction with an SP.

The relay device 920 can amplify weak first polarized signals received from the wireless communication device 910, and then can transfer the amplified first polarized signals to the server 930. Accordingly, the wireless communication device 910 can perform a quantum cryptography authentication function by using only low output, and can transfer quantum cryptogram information to the server 930 over a long distance.

The separation of a quantum cryptography process and an authentication process, which is a feature of the present invention, can be implemented because the present invention is based on the newly proposed quantum cryptography and authentication protocol. In other words, a quantum cryptogram can be received using only weak polarized signals generated by a mobile device, and information required for the generation of a secret key is shared between authentication agents via a separate channel, with the result that the mobile device does not need to be equipped with an expensive optical reception device. Furthermore, a process for the generation, transmission, reception and checking of a quantum cryptogram and a process for user authentication using a secret key generated using the quantum cryptogram are separate, and thus a quantum cryptography and authentication model using a relay device becomes available, with the result that the users of mobile devices can use quantum cryptography and authentication service by using relay devices installed at shops, homes, offices, etc. without spatial limitations.

The relay method for quantum cryptography authentication or quantum cryptography communication according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

According to the present invention, the authentication protocol using quantum cryptography via the relay device between the mobile device and the server can be implemented by improving part of an authentication process via quantum cryptography in order to be formed to be small and lightweight and to be implemented at low cost. Accordingly, in mobile commerce, user authentication can be performed while high security is being maintained.

Although the security level of quantum cryptography is significantly high, the complete system of the conventional quantum cryptography technology is expensive, and thus there is a demand for an inexpensive, efficient communication and authentication technology. According to the present invention, components required for quantum cryptography and authentication are distributed among and provided in the communication device, the relay device, and the server, and thus general users can use a communication and authentication technology using the high-level security of quantum cryptography while carrying communication devices each equipped with a quantum cryptography generation device. Meanwhile, components required for the reception and authentication of a quantum cryptogram are distributed between and provided in the relay device and the server, and thus an SP or a network operator can provide communication and authentication services using the high-level security of quantum cryptography at relatively low cost.

According to the present invention, the advantage of improving the security of a mobile payment application can be achieved by using user authentication via the quantum cryptography authentication method between the communication device and the relay device or server.

Furthermore, the communication device according to the present invention only sends a polarized signal or a quantum signal, to which a phase time difference has been imparted, to the server and does not need to be equipped with an optical reception function module, and thus the quantum cryptography protocol practically applicable to the communication device is proposed. The present invention provides a significant cost reduction effect compared to the conventional quantum cryptography technique. The present invention can achieve the above cost reduction effect in such a manner that the server receives the polarized signal or quantum signal, to which a phase time difference has been imparted, via the relay device, interprets the signal, and shares basis information (polarization or phase basis information) with the communication device via a general communication network. In other words, the communication device generates a secret key, and the basis information used for the interpretation of the generated secret key between a sending side (the communication device) and a reception side (the relay device or server) is shared via a separate network, and thus it is considered that information about a quantum cryptogram whose identification has been succeeded by both the sending side and the reception side is shared between them. In this case, a user authentication process can be performed between the sending side and the reception side by using the quantum cryptogram, whose identification has been succeeded by both the sending side and the reception side, as a secret key.

Furthermore, according to the present invention, mobile commerce via quantum cryptography and user authentication can be implemented regardless of an environment in which a wired communication technique via a optical fiber or a free-space optical communication via a laser diode or photo diode can be used as a technique for sending a polarized signal or a quantum signal, to which a phase time difference has been imparted, including a quantum cryptogram from the communication device to the relay device or server.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A relay device for quantum cryptography authentication, the relay device comprising:
   an optical receiver configured to generate a series of second quantum signals by receiving a series of first quantum signals using a second quantum filter, the series of first quantum signals generated by being transmitted using a first quantum filter from a communication device, and passing through a first quantum channel between the communication device and the relay device;
   an optical transmitter configured to transmit the series of second quantum signals using the second quantum filter to a server that generates a series of third quantum signals by receiving the series of second quantum signals using a third quantum filter, the second quantum signals passing through a second quantum channel between the relay device and the server, wherein the series of second quantum signals are generated such that at least a part of the series of first quantum signals pass through the second quantum filter at the relay and are transferred to the server via the second quantum channel, pass through the second quantum channel, and reach the server; and
   a processor configured to:
      control quantum signal generation characteristics of the optical receiver and the optical transmitter based on information of the second quantum filter;
      share the information of the second quantum filter with the communication device and the server via a non-quantum channel, receive information of the third quantum filter from the server via the non-quantum channel, and share the information of the third quantum filter with the communication device; and
      generate a first secret key by applying information of the first quantum filter, the second quantum filter, and the third quantum filter to the series of second quantum signals, wherein the first secret key is the same as a second secret key generated by the communication device applying the information of the first quantum filter, the second quantum filter, and the third quantum filter to the series of first quantum signals, and wherein the first secret key is the same as a third secret key generated by the server applying the information of the first quantum filter, the second quantum filter, and the third quantum filter to the series of third quantum signals; and
      perform user authentication in conjunction with the communication device and the server by using the first secret key.

2. The relay device of claim 1, wherein:
   the processor is further configured to randomly generate a series of quantum states based on random numbers;
   generate the information about the second quantum filter based on the series of quantum states generated by a random number generator; and
   transfer information about whether the user authentication is successful to the server.

3. The relay device of claim 1, wherein the series of first quantum signals pass through the first quantum channel by using a free-space optical communication.

4. The relay device of claim 1, wherein the optical transmitter is configured to:
   transfer the series of second quantum signals to the server by using an optical cable; or
   transfer the series of second quantum signals to the server by using a free-space optical communication.

5. The relay device of claim 4, wherein the optical transmitter is further configured to transfer the series of second quantum signals to the server via a satellite relay device by using a free-space optical communication.

6. A relay device for quantum cryptography communication, the relay device comprising:
   an optical receiver configured to generate a series of second quantum signals by receiving a series of first quantum signals using a second quantum filter, the series of first quantum signals generated by being transmitted from a communication device using a first quantum filter and passing through a first quantum channel between the communication device and the relay device;
   an optical transmitter configured to transmit the series of second quantum signals using the second quantum filter to a server, wherein the second quantum signals are generated such that at least a part of the series of first quantum signals pass through a second quantum channel between the relay device and the server and reach the server, and wherein the series of second quantum signals are generated such that at least the part of the series of first quantum signals pass through the second quantum filter at the relay and are transferred to the server via the second quantum channel, pass through the second quantum channel, and reach the server; and
   a processor configured to:
      identify information of the first quantum filter received from the communication device;
      receive information of the second quantum filter from the server via a non-quantum channel;
      control the optical receiver to generate the series of second quantum signals by receiving the series of first quantum signals using the second quantum filter based on the information of the second quantum filter received from the server;
      control the optical transmitter to transmit the series of second quantum signals to the server using the second quantum filter based on the information of the second quantum filter received from the server;
      generate a secret key in conjunction with the communication device based on the information of the first quantum filter and the information of the second quantum filter; and
      perform user authentication in conjunction with the communication device by using the secret key.

7. The relay device of claim 6, wherein the series of first quantum signals pass through the first quantum channel by using a free-space optical communication.

8. The relay device of claim 6, wherein the optical transmitter is further configured to:
- transfer the series of second quantum signals to the server by using an optical cable; or
- transfer the series of second quantum signals to the server by using a free-space optical communication.

9. The relay device of claim 8, wherein the optical transmitter is configured to transfer the series of second quantum signals to the server via a satellite relay device by using a free-space optical communication.

10. A relay method for quantum cryptography authentication, the relay method comprising:
- generating, by an optical receiver, a series of second quantum signals by receiving a series of first quantum signals using a second quantum filter, the series of first quantum signals generated by being transmitted using a first quantum filter from a communication device, and passing through a first quantum channel between the communication device and the relay device;
- transmitting, by an optical transmitter, the series of second quantum signals using the second quantum filter to a server that generates a series of third quantum signals by receiving the series of second quantum signals using a third quantum filter, the second quantum signals passing through a second quantum channel between the relay device and the server, wherein the series of second quantum signals are generated such that at least a part of the series of first quantum signals pass through the second quantum filter at the relay and are transferred to the server via the second quantum channel, pass through the second quantum channel, and reach the server;
- controlling, by a processor, quantum signal generation characteristics of the optical receiver and the optical transmitter based on information of the second quantum filter;
- sharing, by the processor, the information of the second quantum filter with the communication device and the server via a non-quantum channel, receiving information of the third quantum filter from the server via the non-quantum channel, and sharing the information of the third quantum filter with the communication device;
- generating, by the processor, a first secret key by applying information of the first quantum filter, the second quantum filter, and the third quantum filter to the series of second quantum signals; wherein the first secret key is the same as a second secret key generated by the communication device applying the information of the first quantum filter, the second quantum filter, and the third quantum filter to the series of first quantum signals, and wherein the first secret key is the same as a third secret key generated by the server applying the information of the first quantum filter, the second quantum filter, and the third quantum filter to the series of third quantum signals; and
- performing, by the processor, user authentication in conjunction with the communication device and the server by using the first secret key.

11. The relay method of claim 10, further comprising randomly generating a series of quantum states based on random numbers;
- wherein the controlling comprises generating the information about the second quantum filter based on the series of quantum states generated based on the random numbers; and
- wherein the performing user authentication comprises:
  - transferring information about whether the user authentication is successful to the server.

12. The relay method of claim 10, wherein the series of first quantum signals pass through the first quantum channel by using a free-space optical communication.

13. The relay method of claim 10, wherein the transmitting, by the optical transmitter, the series of second quantum signals comprises:
- transferring the series of second quantum signals to the server by using an optical cable; or
- transferring the series of second quantum signals to the server by using a free-space optical communication.

14. The relay method of claim 13, wherein the transmitting, by the optical transmitter, the series of second quantum signals comprises transferring the series of second quantum signals to the server via a satellite relay device by using a free-space optical communication.

15. A relay method for quantum cryptography communication, the relay method comprising:
- generating, by an optical receiver, a series of second quantum signals by receiving a series of first quantum signals using a second quantum filter, the series of first quantum signals generated by being transmitted using a first quantum filter from a communication device, and passing through a first quantum channel between the communication device and the relay device;
- transmitting, by an optical transmitter, the series of second quantum signals using the second quantum filter to a server that generates the series of second quantum signals by receiving the series of second quantum signals using the second quantum filter, the second quantum signals passing through a second quantum channel between the relay device and the server, wherein the series of second quantum signals are generated such that at least a part of the series of first quantum signals pass through the second quantum filter at the relay and are transferred to the server via the second quantum channel, pass through the second quantum channel, and reach the server;
- identifying, by a processor, information of the first quantum filter received from the communication device;
- receiving, by the processor, information of the second quantum filter from the server via a non-quantum channel;
- controlling, by the processor, characteristics of the optical receiver and the optical transmitter based on the information of the second quantum filter received from the server;
- generating, by the processor, a secret key in conjunction with the communication device based on the information of the first quantum filter and the information of the second quantum filter; and
- performing, by the processor, user authentication in conjunction with the communication device by using the secret key.

16. The relay method of claim 15, wherein the series of first quantum signals pass through the first quantum channel by using a free-space optical communication.

17. The relay method of claim 15, wherein the transmitting comprises:
- transferring the series of second quantum signals to the server by using an optical cable; or
- transferring the series of second quantum signals to the server by using a free-space optical communication.

18. The relay method of claim 17, wherein the transmitting comprises transferring the series of first quantum signals to the server via a satellite relay device by using a free-space optical communication.

* * * * *